United States Patent [19]
Johnston

[11] 3,803,937
[45] Apr. 16, 1974

[54] BICYCLE BRAKE LEVER
[76] Inventor: Lowell B. Johnston, Box 531, Daly City, Calif. 94017
[22] Filed: Dec. 8, 1972
[21] Appl. No.: 313,579

[52] U.S. Cl............... 74/489, 24/271, 74/551.6, 287/54 E
[51] Int. Cl... G05g 13/00, B62k 23/06, B62k 21/22
[58] Field of Search....... 74/471 R, 489, 488, 551.1, 74/551.3, 551.6, 551.7; 24/271; 248/291

[56] References Cited
UNITED STATES PATENTS
| 560,998 | 5/1896 | Johnson | 74/551.6 |
| 610,736 | 9/1898 | Dieterich | 74/551.7 |
| 3,403,577 | 10/1968 | Ozaki | 74/489 X |
| 3,719,104 | 3/1973 | Dian | 74/489 |

FOREIGN PATENTS OR APPLICATIONS
| 835,778 | 10/1937 | France | 74/489 |
| 7,798 | 5/1908 | Great Britain | 287/54 E |
| 638,790 | 2/1928 | France | 74/551.1 |

Primary Examiner—Allen D. Herrmann
Attorney, Agent, or Firm—Limbach, Limbach & Sutton

[57] ABSTRACT

An improvement for bicycles having drop-style handlebars. The brake handles are extended to both sides of its pivotal point of attachment to the handlebars. A quick release connection of the handlebars to its support post permits rotation of the handlebars with respect to the support post.

10 Claims, 5 Drawing Figures

PATENTED APR 16 1974　　　　　　　　　　　　　　3,803,937

3,803,937

BICYCLE BRAKE LEVER

BACKGROUND OF THE INVENTION

The present invention relates to an improvement in the structure of bicycles and more particularly to an improvement in the braking and steering mechanisms for bicycles having drop-style handlebars with hand brake levers attached thereto.

The popularity of lightweight bicycles having drop style handlebars is high. These bicycles generally have a 10-speed drive and double hand brakes, one for each of the wheels, which are operated by levers attached to the handlebars. The ends of the handlebars are designed to be gripped by the hands of the rider and require that he be bent over while in such a position. This is an excellent position for bringing force and effort against the pedal when climbing a hill, going fast or on some other occasion when special effort is needed. But such a position is neither pleasant nor comfortable for leisurely touring on the bike when the rider desires to look around or talk with riding companions. When in a bent over position, the head cannot easily be raised to observe his surroundings, the back is bent at the hips and about half the body's weight is supported by the arms and shoulders of the rider on the handlebars.

When such a high degree of effort is not required, the rider desires to position himself in a restful upright position. In order to get in this more comfortable position, he must either ride without holding onto the handlebars, which has the disadvantage of losing control of steering and brake operation, or he straightens up as much as possible while keeping his fingers touching the handlebars. The latter position still leaves his back and neck bent and places his arms under unpleasant tension, still without providing any positive control over the brakes.

Some riders have modified their bicycles by rotating their drop-style handlebars with respect to the bicycle support post. Normally the drop-style handlebars are in a position with their hand grip ends at an elevation that is lower than the point of attachment of the handlebars to the bicycle support post. By rotating the handlebars with respect to the support post, the hand grip ends of the handlebars are now elevated above the support point of the handlebars. Additionally, the brake levers that are pivotably mounted adjacent each end of the handlebars are closer to the rider. Riders who so modify their bicycles generally sit upright and hold the brake levers for steering. Although this position is more comfortable, there are certain disadvantages in operating the bike. First, the rider cannot alter his position into the bent over position when he wants to exert a great deal of effort so long as the handlebars are permanently clamped to their support post in an upright position. Secondly, such a riding position is dangerous since the weight of the arms and hands of the rider holding onto the brake handle tends to operate the brakes. Increasing brake action throws the rider forward which then pushes the brake handles further down and increases the braking action even more. The result is that the brakes may be applied accidentally and so hard that the rider is thrown forward over the handlebars. Riding with such a bicycle modification is particularly dangerous when manuevering in automobile traffic where braking sensitivity and positive steering is essential.

Therefore, it is a primary object of the present invention to provide an improvement in bicycles with drop style handlebars that permits the rider to select a comfortable upright position or a powerful bent over position and without increasing a danger of sudden accidental braking while the rider is in the upright position.

SUMMARY OF THE INVENTION

These and additional objects are accomplished by the present invention wherein each hand brake lever attached to drop-style handlebars are extended in a direction past its pivot point, and a quick release mechanism is provided on the handlebar support post to permit rotation of the handlebars by the rider into either the normal down position for hard riding or an upright position for leisurely riding.

The brake lever extension is designed so that when the handlebars are rotated to the up position, the rider may grasp the extensions for positively steering the bicycle. The weight of rider on the brake handle extension, since it is on the opposite side of the brake handle pivot point from the normal brake handle, tends to disengage the brakes and causes the brake handle to abut against a fixed stop. When brakes are to be applied, the brake handle extensions are lifted upward by the rider, a motion that is not likely to occur accidentally. The rider may rest his arms on the brake handle extension without accidentally putting on the brakes.

When the rider desires to change the handlebars between up and down positions, he merely releases the quick release coupling mechanism on the handlebar support post, rotates the handlebars with respect thereto and then re-engages the coupling mechanism to hold the handlebars firmly to the support post in their new position. In either position, the rider has a solid, positive means with which to steer and brake the bike. The rider can sit up with full visibility of his surroundings and in a relaxed position while still being able to go around corners and to manuever through traffic.

Additional objects and advantages of the present invention will become apparent from the following detailed description which should be taken in conjunction with the accompanying drawings.

DESCRIPTION OF THE PREFERRED EMBODIMENTS

Figure 1:
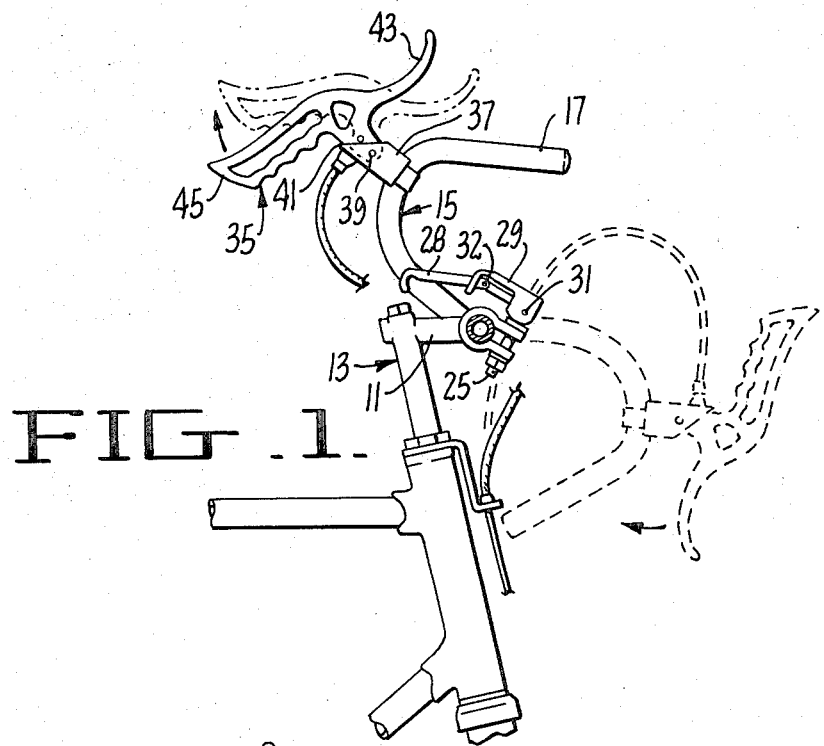
FIG. 1 is a drawing of the front handlebar portion of a bicycle with the improvements of the present invention illustrated thereon.

FIG. 1 shows a side view of a front portion of a typical bicycle having drop-style handlebars. A substantially horizontal extension 11 of a handlebar support post 13 holds the drop-style handlebars 15. An end 17 of the handlebars is adapted for gripping by a hand of the bicycle rider when the handlebars are in the down position shown in dotted outline in FIG. 1. To hold onto the hand grip end 17 of the handlebars 15 while in the dotted position shown requires that the rider be bent over in the uncomfortable, hard peddling position. Only one handlebar hand gripping end 17 is shown in FIG. 1 for clarity but it will be understood that the handlebars 15 have two such ends on opposite sides of the main bicycle frame and that each hand gripping end includes a brake lever associated therewith.

In order to permit a bicycle rider to easily move the handlebars 15 between the up and down positions, as alternately shown in FIG. 1, a quick release mechanism is provided at the end of the support post 13 to which the handlebars are attached. This mechanism is shown in an enlarged view in FIG. 3. A middle portion of the tubular handlebars 15 is surrounded in part by a clamp 19 terminating in substantially parallel flanges 21 and 23. A pin 25 extends through openings in the flanges 21 and 23, one end of the pin carrying a nut 27 or some other appropriate device for limiting travel of the pin 25 in an upward direction. At a substantially right angled bend of the pin 25 is attached a cam member 29 that is rotatably held to the pin 25 by a smaller pin 31.

Figure 3:
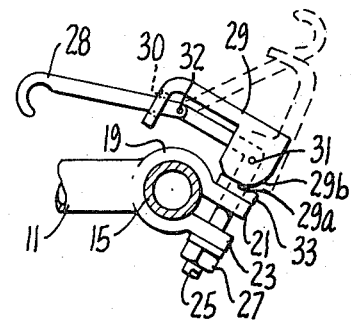
FIG. 3 shows an enlarged view of a portion of the embodiment of FIG. 1.

When the cam member 29 is rotated about the pin 31 into the position shown in solid lines in FIG. 3, its outside edge portion 29a pushes against a bearing washer 33 to pull the flanges 21 and 23 together and thus to grip the handlebars 15 tightly. The surface portion 29a is preferably somewhat flat in order to prevent loosening of the handle 29 from vibration and bumps as the bicycle is operated. A circularly shaped outside surface portion 29b is eccentric with respect to the pin 31 so that the force holding the flanges 21 and 23 together is released when the cam member 29 is moved to the dotted position shown in FIG. 3. The handlebars 15 may then be rotated with respect to the clamping member 19.

Rather than operating the cam member 29 directly, additional elements are provided in cooperation therewith in order to form a quick release lever having a mechanical advantage for easy operation by a bicycle rider. A lever 28 is connected to an end of the right angled pin 25 by a pivot pin 32. The handle 28 extends through an aperture 30 in an end of the cam member 29. As the handle 28 is moved away from the member 11, it rotates about the pin 32 and urges the cam member 29 at the aperture 30 to rotate about the pin 31 into the dotted position shown in FIG. 3, whereby the handlebars 15 are released for movement by the rider between the up and down positions. After such handlebar movement, the rider rotates the handle 28 back to the solid position shown in FIG. 3 to clamp the handlebars 15 in a new position.

A brake handle 35 shown in FIG. 1 is one embodiment of a modified brake handle according to the present invention. The brake handle 35 is rotatably attached to a support piece 37 at a pin 39. Rotation of the brake handle 35 from its solid position of FIG. 1 to its back position pulls on a cable to operate the brakes that frictionally engage one of the bicycle wheels. A spring member within the brake (not shown) normally urges the brake lever 35 toward its rest position as shown in solid outline in FIG. 1. The brake lever is prevented from rotating about its pin 39 in a counterclockwise direction any further than that shown by engagement with a positive stop in the form of an edge 41 of the support member 37.

The one piece brake member 35 includes a prior art handle portion 43. What is new is an extension 45 which extends the brake handle 43 to the opposite side of the pin 39. The underside of the handle extension 45 is provided with surface undulations for receiving fingers of a human hand. A bicycle rider, when desiring to sit in an upright position, can hold on with one hand to the extension 45 by positively gripping it. His other hand holds onto a similar brake lever on the other end of the handlebars 15 (not shown). Positive steering is thus made possible while the rider is in an upright sitting position. Braking is conveniently accomplished by lifting the handle 45 upward. The weight of the rider or of his arms and hands will not apply the brakes but rather will merely force the handle assembly 35 about its pivot pin 39 against the positive stop 41, past which it cannot move. The handle portion 43 remains so that the rider may rotate the handlebars 15 to the down position shown in dotted outline in FIG. 1 and operate the brake handles of the bicycle as before.

Figure 2:
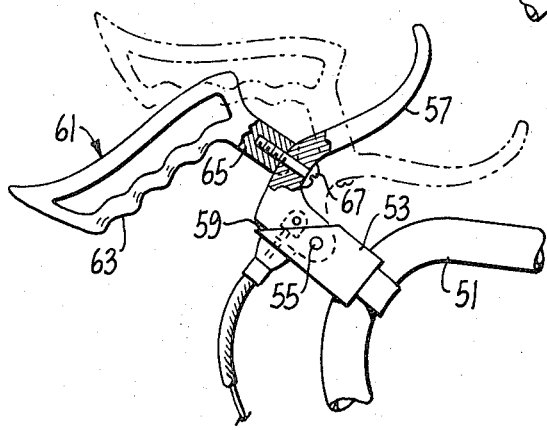
FIG. 2 is a modification of a component of FIG. 1.

A one piece improved brake handle, such as the handle 35 shown in FIG. 1, is preferred for installation as part of new bicycles. For existing bicycles, it may be preferable to add a handle portion to an existing brake lever rather than to replace the entire brake lever. Referring to FIG. 2, drop style handlebars 51 have a hand brake assembly attached thereto including a supporting member 53, a pivot pin 55 and an existing brake handle 57 carried by said pin 55. The existing brake handle 57 is restrained from counterclockwise rotation about the pin 55 by a back edge 59 of the support member 53.

The existing brake lever 57 is extended to the other side of the pivot pin 55 by attachment thereto of a hand grip member 61. The member 61 has a surface indulations 63 along its bottom edge for receiving fingers of a hand that is gripping the member 61. The hand grip member 61 includes a post 65 integrally formed as a part thereof at one end. The post 65 has an end shaped cooperatively with the surface shape of the portion of the brake handle 57 that it is to contact and the hand grip 61 is attached to the lever in any appropriate manner. In one embodiment of the invention a machine screw 67 passes through a hole which is drilled in the existing brake lever 57 and threadedly engages an aperture coaxially with the post 65 of the extension member 6.

Figure 4:
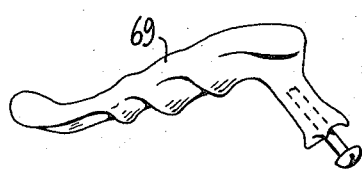
FIG. 4 is a modification of the embodiment of FIG. 2.

FIG. 4 illustrates a different style of handle extension that could be substituted for the member 61 of FIG. 2. A handle 69 of FIG. 4 is a solid member shaped to fit a human hand that will be gripping it. Undulations are provided on its underside for positive interaction with human fingers.

Figure 5:
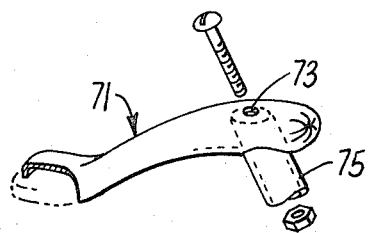
FIG. 5 shows yet another modification of the embodiment of FIG. 2.

Referring to FIG. 5, yet another brake handle extension member 71 is illustrated that may be substituted for the member 61 of FIG. 2. The handle member 71 is constructed of sheet metal and formed into a hollow tube-like structure which has an advantage of being lightweight and of economical construction. An aperture 73 is provided along the length of an attachment post 75 for receiving a fastening member to hold the handle extension 71 to an existing bicycle brake handle.

It will be understood that the various aspects of the present invention have been described with respect to their preferred embodiments, but that the invention is entitled to protection within the full scope of the appended claims.

I claim:

1. In a bicycle that includes:

drop style handlebars having hand gripping surfaces near their ends, a post attached to said bicycle for supporting said handlebars at a point and in a normal position with said gripping surfaces lower than said point, and at least one brake lever pivotably attached to said handlebars adjacent one of said gripping surfaces, said lever normally held on the outside of said handlebars in a manner to be rotatable about a pivot point from a fixed stop position toward said handlebars to apply a brake, said fixed stop defining the maximum extent of rotation of the brake lever away from said handlebars, the improvement comprising:

means connecting said support post and said handlebars at said point for providing quick manual release therebetween to permit rotation of the handlebars with respect to the support post into a position wherein the hand gripping surfaces are above said connection point, and an extension of said brake lever beyond its pivot point, said extension including a hand grip portion substantially parallel to said brake lever, whereby when said handlebars are rotated into a position wherein the hand gripping surfaces are above said connection point, said extension hand grip portion is held to steer the bicycle with downward pressure holding the brake lever against said fixed stop and said extension hand grip portion is lifted to apply a brake.

2. The improved bicycle of claim 1 wherein said handlebar release means includes;

a clamp as part of said support post for extending around a significant portion of the handlebars and providing two flanges that close said clamp onto said handlebars when squeezed together, a pin means extending between said flanges, said pin means limited at one end thereof against axial travel with respect to the flanges, and a lever pivotably mounted to another end of said pin means and having an eccentric surface with respect to said pivot providing gripping of said flanges when in one rotatable position and a loosening of said flanges when in another rotatable position.

3. The improved bicycle of claim 1 wherein said brake lever and its extension are formed of a single integrated structure pivotably mounted to said handlebars.

4. The bicycle improvement of claim 1 wherein said brake lever extension is separable from said brake lever but normally rigidly attached thereto.

5. The bicycle improvement of claim 1 wherein said brake lever extension includes a plurality of indentations adapted for gripping by human fingers, said indentations being provided on the side of said extension closest to said handlebars.

6. For a bicycle having drop style handlebars with hand gripping surfaces near their ends, at least one brake lever pivotably attached to said handlebars adjacent one of said hand gripping surfaces, said brake lever extending along said handlebars in only one direction from its pivot point and operable to apply brakes when pivoted thereabout in a manner to be drawn toward said handlebars, the improvement comprising a hand grip element adapted for attachment to said brake handle for forming an extension thereof to the opposite side of said pivot point, said extension including a hand gripping portion substantially parallel to said brake lever, whereby when said handlebars are rotated into a position wherein the hand gripping surfaces are rotated above said connection point of the handlebars to the bicycle, said extension hand grip portion is held to steer the bicycle with downward pressure holding the brake lever away from said handlebars and said extension hand gripping portion is lifted to apply a brake.

7. The improvement of claim 6 wherein said hand grip element is provided adjacent one end thereof with a post-like element having an aperture along its length for receiving a fastening element for attachment to said brake handle, and said hand gripping portion thereof extending from said post-like element at an angle that results in the hand grip portion being substantially parallel to said brake lever when attached thereto.

8. The improvement of claim 6 wherein said hand grip element is formed of sheet metal material in generally a tubular shape.

9. The improvement of claim 6 wherein the hand grip element includes an extension adapted for encirclement by a hand and including undulations along one side thereof for receiving a gripping hand's fingers, said hand grip element additionally including a post attached thereto at a finite angle therewith, said post having a surface shape at its end removed from the handheld extension surface which cooperates with the bicycle brake lever for resting thereon.

10. In a bicycle that includes:

drop style handlebars having hand gripping surfaces near their ends, a post attached to said bicycle for supporting said handlebars at a point and in a normal position with said gripping surfaces lower than said point, and at least one brake lever pivotably attached to said handlebars adjacent one of said gripping surfaces, said lever normally held on the outside of said handlebars in a manner to be rotatable about a pivot point from a fixed stop position toward said handlebars to apply a brake, said fixed stop defining the maximum extent of rotation of the brake lever away from said handlebars, the improvement comprising:

means connecting said support post and said handlebars at said point for providing quick manual release therebetween to permit rotation of the handlebars with respect to the support post into a position wherein the hand gripping surfaces are above said connection point, said handlebar release means including:

a clamp as part of said support post for extending around a significant portion of the handlebars and providing two flanges that close said clamp onto said handlebars when squeezed together, a pin means extending between said flanges, said pin means limited at one end thereof against axial travel with respect to the flanges, and a lever pivotably mounted to another end of said pin means and having an eccentric surface with respect to said pivot providing gripping of said flanges when in one rotatable position and a loosening of said flanges when in another rotatable position, an extension of said brake lever beyond its pivot point, said pin means including an extension portion projecting to a free end perpendicularly rigidly from the pin means extending between said flanges, a handle member pivotally connected to said free end of said extension portion, and said lever having an aperture passing said handle member and whereby operation of said handle member moves said lever between said one and said other positions.

* * * * *